US012204569B2

(12) United States Patent
Christensen et al.

(10) Patent No.: US 12,204,569 B2
(45) Date of Patent: Jan. 21, 2025

(54) NATURAL LANGUAGE UNDERSTANDING CLARIFICATIONS

(71) Applicant: GOOGLE LLC, Mountain View, CA (US)

(72) Inventors: Janara Christensen, Menlo Park, CA (US); Siddharth Gopal, Sunnyvale, CA (US); Manaal Faruqui, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 616 days.

(21) Appl. No.: 17/193,644

(22) Filed: Mar. 5, 2021

(65) Prior Publication Data
US 2022/0284049 A1    Sep. 8, 2022

(51) Int. Cl.
*G06F 16/33*    (2019.01)
*G06F 16/332*    (2019.01)
*G06F 16/335*    (2019.01)
*G06N 20/00*    (2019.01)

(52) U.S. Cl.
CPC ...... *G06F 16/3329* (2019.01); *G06F 16/3323* (2019.01); *G06F 16/3344* (2019.01); *G06F 16/337* (2019.01); *G06N 20/00* (2019.01)

(58) Field of Classification Search
CPC ............. G06F 16/3329; G06F 16/3344
See application file for complete search history.

(56) References Cited

U.S. PATENT DOCUMENTS

| | | | | |
|---|---|---|---|---|
| 11,303,588 B1* | 4/2022 | Rastogi | ............... | H04L 51/02 |
| 11,574,637 B1* | 2/2023 | Kumar | ............... | G10L 15/22 |
| 11,756,553 B2* | 9/2023 | Freed | ............... | G10L 17/04 |
| | | | | 704/231 |
| 11,762,856 B2* | 9/2023 | Shtilkind | ............... | G06F 16/2455 |
| | | | | 707/769 |
| 2019/0311070 A1* | 10/2019 | Huang | ............... | G06F 16/9532 |
| 2019/0348030 A1* | 11/2019 | Anders | ............... | G06F 3/167 |
| 2020/0104362 A1* | 4/2020 | Yang | ............... | G06N 5/048 |
| 2021/0326742 A1* | 10/2021 | Rosset | ............... | G06N 20/00 |
| 2021/0327413 A1* | 10/2021 | Suwandy | ............... | G06N 3/045 |
| 2022/0030345 A1* | 1/2022 | Gong | ............... | G06F 3/165 |
| 2022/0198587 A1* | 6/2022 | Shi | ............... | G06Q 50/16 |
| 2022/0261406 A1* | 8/2022 | Bhuiyan | ............... | G06F 16/2457 |

* cited by examiner

*Primary Examiner* — Bryan S Blankenagel
(74) *Attorney, Agent, or Firm* — Gray Ice Higdon

(57) ABSTRACT

Techniques are disclosed that enable clarifying whether a user query corresponds to a candidate intent when an intent score (indicating the probability the user query corresponds to the candidate intent) fails to satisfy a threshold likelihood value but is "close" to satisfying the threshold likelihood value. For example, the intent score can fail to satisfy the threshold likelihood value but can satisfy an additional threshold likelihood value. Various implementations include generating the candidate intent and corresponding intent score by processing a natural language user query using a natural language understanding (NLU) model.

20 Claims, 9 Drawing Sheets

NATURAL LANGUAGE UNDERSTANDING CLARIFICATIONS

BACKGROUND

Natural language understanding (NLU) is concerned with interactions between computing device(s) and human language. For example, humans can engage in human-to-computer dialogs with interactive software applications referred to herein as "automated assistants" (also referred to as "digital agents", "chatbots", "interactive personal assistants", "intelligent personal assistants", "conversational agents", etc.). For instance, humans (which when they interact with automated assistants may be referred to as "users") can provide commands and/or requests using spoken natural language input (i.e., spoken utterances) which may in some cases be converted into text and then processed, and/or by providing textual (e.g., typed) natural language input.

NLU models can be used to process spoken natural language input, textual natural language input, etc. to generate a predicted intent of the natural language input. In many implementations, NLU models can utilize a variety of neural network learning techniques to understand natural language.

SUMMARY

Implementations described herein are directed towards clarifying candidate intents generated by processing a user query using a natural language understanding (NLU) model. In some implementations, a user query can be processed using the NLU model to generate (a) a candidate intent of the user query and (b) an intent score indicating the probability the candidate intent corresponds to the user query. In some implementations, the system can determine whether the intent score satisfies a threshold likelihood value. If so, the system can perform action(s) based on the candidate intent. Furthermore, if the intent score does not satisfy the threshold likelihood value, the system can determine whether the intent score satisfies an additional threshold likelihood value. In other words, the system can determine whether the intent score is "close enough" to the threshold likelihood value for further analysis. In some of those implementations, where the intent score is "close to the threshold likelihood value, the system can make a further determination to determine whether the candidate intent corresponds to the user query.

In some implementations, if the intent score fails to satisfy the threshold likelihood value and satisfies the additional threshold likelihood value (i.e., the intent score is close to the threshold likelihood value), the system can perform additional analysis to determine whether the candidate intent corresponds to the user query. For example, a user query of "Hypothetical Brand Router" can be processed using a NLU model to generate a candidate intent of "How to configure Hypothetical Brand Router" with an intent score of 94% indicating the probability of the user query corresponding to the candidate intent. In the illustrated example, the intent score of 94% can be compared with a threshold likelihood value of 95%. In the illustrated example, the intent score of 94% fails to satisfy the threshold likelihood value of 95% (i.e., 94% is less than 95%). In some implementations, the system can then determine whether the intent score satisfies an additional threshold likelihood value of 93%. In other words, the system can determine, when the intent score fails to satisfy a threshold likelihood value, whether the intent score is "close" to the threshold likelihood value by determining whether the intent score satisfies an additional threshold likelihood value. In the illustrated example, the system can determine the intent score of 94% satisfies the threshold likelihood value of 93%. In other words, the system can determine the intent score is "close" to the threshold likelihood value despite not satisfying the threshold likelihood value.

In some implementations, in response to determining a given intent score fails to satisfy a threshold likelihood value and the given intent score satisfies an additional threshold likelihood value, the system can determine whether the system can determine whether there exists a mapping between the user query and the candidate intent. For example, in some implementations, a data structure (e.g., a pointer) can point from the user query to the candidate intent and/or from the candidate intent to the user query. In some other implementations, an association between the user query and the candidate intent can be stored in a feedback table. In some implementations, the mapping can be a global mapping, accessible to a plurality of users. In some implementations, the mapping can be a personalized mapping, corresponding to the user who provided the user query the mapping is based on.

In some implementations, the mapping can be an embedding space mapping which can point from an embedding space representation of the given user query to an embedding space representation of the corresponding candidate intent. In some implementations, the embedding space representation of the user query can be generated by processing the user query using an encoder portion of the NLU model. In some of those implementations, the intent score can be based on a distance between the embedding space representation of the user query and the embedding space representation of the candidate intent.

In some implementations, the system can determine whether the number of times one or more users have previously indicated the candidate intent corresponds to a user intent satisfies a threshold. For example, the system can determine the user query corresponds to the candidate intent, without further input from the user, based on whether the number of times one or more users have previously indicated the user query corresponds to the candidate intent satisfies a threshold value.

Additionally or alternatively, the system can query the user to determine whether the candidate intent corresponds to the user query. For example, the system can render output, such as "did you mean [candidate intent]", to the user. The system can determine whether the candidate intent corresponds to the user query based on the user's response to the query. In some implementations, in response to determining the candidate intent corresponds to the user query by querying the user, the system can generate the mapping between the candidate intent and the user query, an entry in the feedback table indicating a relationship between the user query and the candidate intent, one or more additional or alternative indications the user query corresponds to the user query, and/or combinations thereof. Additionally or alternatively, in some implementations, the system can generate the mapping, feedback table entry, etc., based on whether the number of times one or more users have previously indicated the user query corresponds to the candidate intent satisfies a threshold value. For example, the system can generate a mapping between the user query of "how to hypothetical café" and a candidate intent of "directions to hypothetical café" based on whether the number of times user(s) have previously indicated "how to hypothetical café"

corresponds to "directions to hypothetical café" is greater than 50 times. In some implementations, determining whether the number of times the user has previously indicated the candidate intent corresponds to the user query is a personalized number indicating the number of times a given user has indicated the candidate intent corresponds to the user query. Additionally or alternatively, in some implementations, determining whether the number of times one or more users have previously indicated the candidate intent corresponds to the user query is a global number, indicating the number of times one or more users have indicated the candidate intent corresponds to the user query.

In some implementations, in response to determining a user query corresponds to a candidate intent and/or in response to generating a mapping between a user query and a candidate intent, a training instance for the NLU model can be generated based on the user query and the corresponding candidate intent. For example, the training instance can include a training user query portion and a training candidate intent portion. The NLU model can be used to process the training user query portion of the training instance to generate candidate output. A difference can be determined between the candidate output and the training candidate intent portion of the training instance. In some implementations, one or more portions of the NLU model can be updated based on the determined difference.

In some implementations, once the NLU model has been retrained based on a training instance, the mapping corresponding to the training instance can be purged. For example, a data structure pointing from a given user query to a given candidate intent can be purged after a training instance including the given user query and the given candidate intent has been used to retrain the NLU model. In other words, retraining a model can eliminate the need for the mapping by training the model to generate the candidate intent when provided with the user query. In some implementations, the system can confirm the mapping has been purged. In other words, the system can confirm system resources are not being utilized by the mapping.

Embodiments described herein are described with respect to clarifying a NLU intent. However, this is not meant to be limiting. The output of additional or alternative natural language models may be clarified in accordance with techniques described herein. For example, a spoken utterance (e.g., audio data capturing a natural language spoken utterance) can be processed using an automatic speech recognition (ASR) model to generate a candidate text representation of the spoken utterance and an intent score indicating the probability the candidate text representation corresponds to the spoken utterance. Additionally or alternatively, a query can be processed using a query-similarity model to generate a candidate similar query and an intent score indicating the probability the candidate similar query corresponds to the query.

Implementations described herein are directed towards clarifying natural language intents that are "close" to satisfying a threshold value indicating a user query corresponds to the intent. A system using conventional techniques may not correctly identify a candidate intent corresponding to a "close" user query. In some cases, conventional techniques may lead to less accurate natural language processing (e.g., a candidate intent will not be identified as corresponding to a user query when it may be with techniques described herein). In some implementations, a system can generate a mapping between an embedding space representation of a user query and an embedding space representation of a candidate intent (e.g., a data structure such as a pointer which associates the embedding space representation of the user query with the embedding space representation of the candidate intent), and may use this mapping to determine the candidate intent corresponds to the user query during an additional iteration of the user query. This can improve accuracy in the NLU model without having to retrain the NLU model. Computing resources (e.g., processor cycles, memory, battery power, power, etc.) can be conserved by less frequently retraining the NLU model without sacrificing model accuracy.

In some implementations, the system can generate training instance(s) based on the same user query and corresponding candidate intent pairs used to generate mappings, where the training instances can be used in retraining the NLU model. The mapping corresponding to a training instance can be purged after the NLU model is retrained using the given training instance. Purging the mapping once the NLU model has been retrained based on the mapping can free up system resources (e.g., memory) for the computing system.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
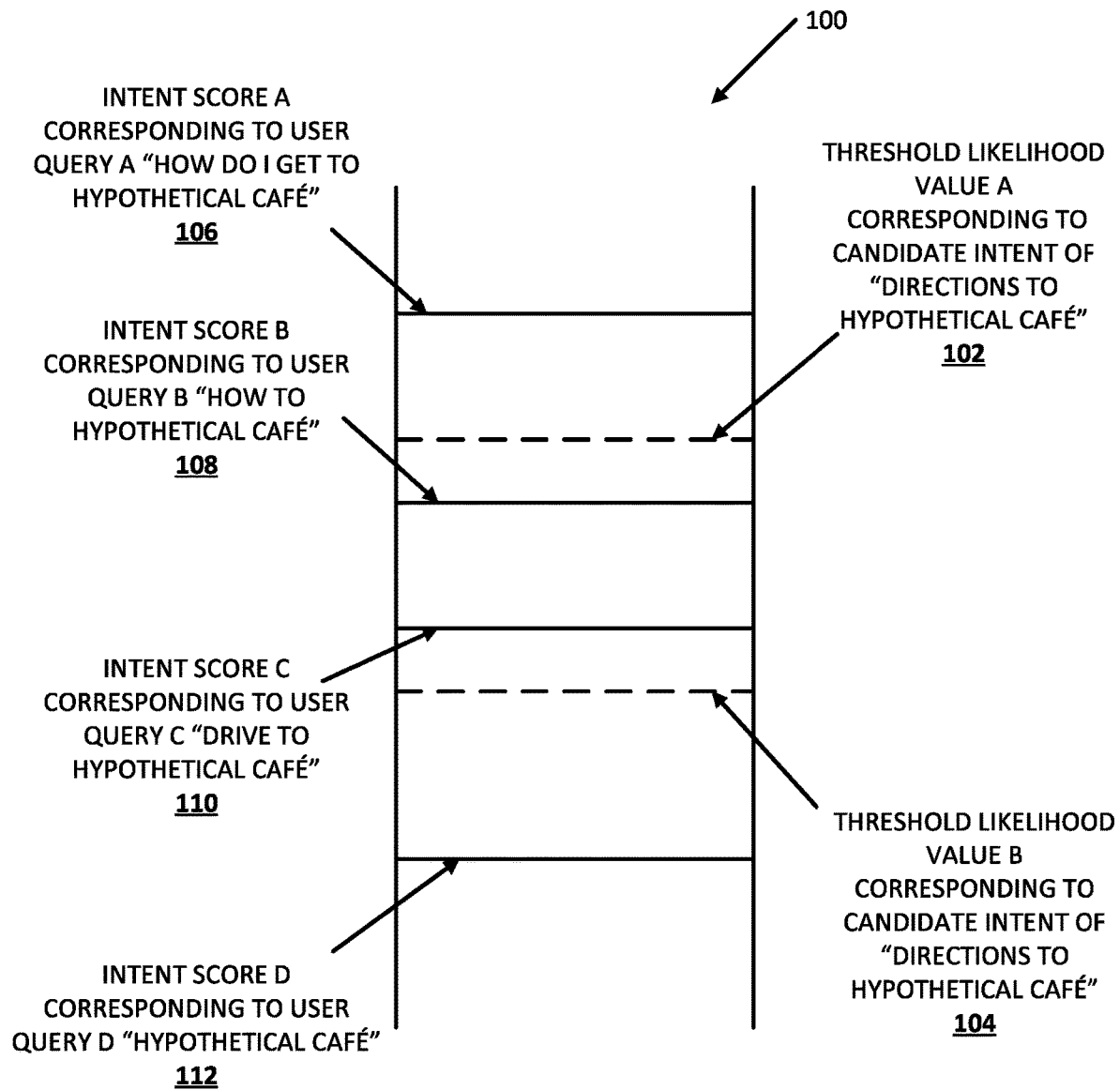
FIG. 1 illustrates an example of comparing intent scores with threshold likelihood values in accordance with various implementations described herein.

Turning now to the figures, FIG. 1 illustrates an example 100 of comparing intent scores with threshold likelihood values. Example 100 includes threshold likelihood value A 102 and threshold likelihood value B 104 corresponding to a candidate intent of "directions to hypothetical café". In the illustrated example, threshold likelihood value A 102 is greater than threshold likelihood value B 104. In some implementations, one or more intent scores can be compared with one or more threshold likelihood values to determine whether a user query corresponding to the given intent score corresponds to the candidate intent. In some implementations, a user query can be processed using a NLU model to generate (a) a candidate intent and/or (b) an intent score indicating the probability the generated candidate intent corresponds to the user query.

Example 100 includes: (1) intent score A 106 corresponding to user query A of "how do I get to hypothetical café", (2) intent score B 108 corresponding to user query B of "how to hypothetical café", (3) intent score C 110 corresponding to user query C of "drive to hypothetical café", and (4) intent score D 112 corresponding to user query D of "hypothetical café".

In the illustrated example, threshold likelihood value A 102 is greater than threshold likelihood value B 104. For example, threshold likelihood value A 102 can be 95% and threshold likelihood value B 104 can be 93%. In some of those implementations, an intent score corresponds to the candidate intent of "directions to hypothetical café" if it is greater than (or equal to) 95% threshold likelihood value (i.e., satisfies threshold likelihood value A 102). Additionally or alternatively, an intent score may correspond to the candidate intent of "directions to hypothetical café" if it is less than 95% and greater than (or equal to) 93% (i.e., fails to satisfy threshold likelihood value A 102 and satisfies threshold likelihood value B 104). Furthermore, an intent score does not correspond to the candidate intent of "directions to hypothetical café" if the intent score is less than 93%. In other words, the system can determine an intent score does correspond to the candidate intent if it is greater than threshold likelihood value A 102, can determine the intent score does not correspond to the candidate intent if it is less than threshold likelihood value B 104, and make additional determination(s) if the intent score is "close" to satisfying threshold likelihood value A (e.g., the intent score is between threshold likelihood value A 102 and threshold likelihood value B 104).

In the illustrated example, intent score A 106 corresponding to user query A of "how do I get to hypothetical café" is greater than threshold likelihood value A 102. Therefore the system can determine user query A "how do I get to hypothetical café" corresponds to the candidate intent of "directions to hypothetical café". Additionally or alternatively, the system can determine intent score B 108, intent score C 110, and intent score D 112 do not satisfy threshold likelihood value A 102 (e.g., are less than threshold likelihood value A). However, the system can determine intent score B 108 and intent score C 110 satisfy threshold likelihood value B 104, and therefore the system can make a further determination to determine whether one or more of the user queries correspond to the candidate intent.

For instance, the system can determine whether user query B of "how to hypothetical café" corresponds to the candidate intent of "directions to hypothetical café" by querying the user. In some implementations, the system can determine user query B of "how to hypothetical café" corresponds to the candidate intent of "directions to hypothetical café" based on an affirmative response from the user. In some implementations, the system can determine user query B of "how to hypothetical café" corresponds to the candidate intent of "directions to hypothetical café" based on a mapping between an embedding space representation of user query B and an embedding space representation of the candidate intent, and/or based on an entry in a feedback table.

Additionally or alternatively, the system can determine whether user query C of "drive to hypothetical café" corresponds to the candidate intent of "directions to hypothetical café" by querying the user, based on a mapping between user query C and the candidate intent, based on an entry in a feedback table, based on additional or alternative determinations, and/or combinations thereof. For instance, the system can determine user query C does not correspond to the candidate intent of "directions to hypothetical café" based on a response for the user. Furthermore, the system can determine user query D of "hypothetical café" does not correspond to the candidate intent of "directions to hypothetical café" based on determining intent score D 112 fails to satisfy threshold likelihood value A 102 and threshold likelihood value B 104.

Figure 2A:
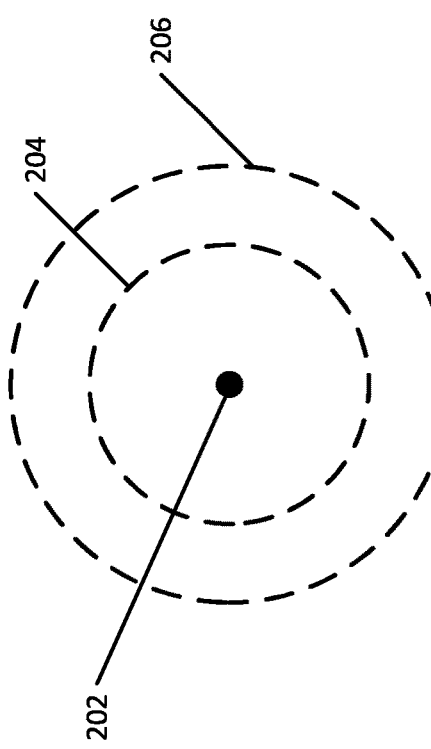
FIG. 2A illustrates an example of an embedding space representation of a user query in accordance with various implementations disclosed herein.

FIG. 2A illustrates an example embedding space representation of a candidate intent 202. In some implementations, the embedding space representation of the candidate intent 202 can be generated by processing a candidate intent using an embedding model, an encoder model portion of a NLU model, etc. For example, the system can process the candidate intent of "how to reset hypothetical brand router" using an encoder portion of a NLU model to generate the embedding space representation of the candidate intent 202. In some implementations, the system can determine whether an embedding space representation of a user query corresponds to the embedding space representation of the candidate intent based on a distance between the embedding space representation of the user query and the embedding space representation of the candidate intent. For example, the system can determine a user query corresponds to the candidate intent if the embedding space representation of the user query is within a threshold distance 204 (represented by a dashed circled around candidate intent 202). Similarly, the system can determine a user query may correspond to the candidate intent if the embedding space representation of the user query is greater than the threshold distance 204, but is less than an additional threshold distance 206 (represented by an additional dashed circle around candidate intent 202). In some implementations, the distance between the embedding space representation of the candidate intent and the additional threshold distance 206 is greater than the distance between the embedding space representation of the candidate intent and the threshold distance 204.

Figure 2B:
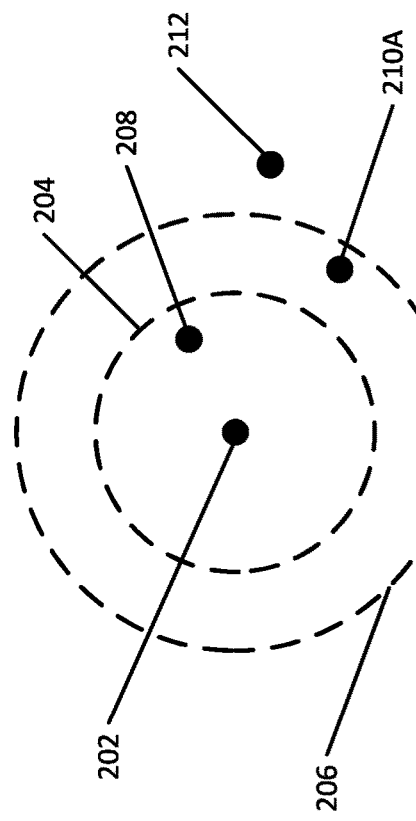
FIG. 2B illustrates an example of the embedding space representation of the user query and an embedding space representation of a plurality candidate intents in accordance with various implementations disclosed herein.

FIG. 2B illustrates the embedding space representation 202, the threshold distance 204, and the additional threshold distance 206. Additionally or alternatively, FIG. 2B includes the embedding space representation of user query A 208, the embedding space representation of user query B 210A, and the embedding space representation of user query C 212. In some implementations, the embedding space representation of a given user query can be generated by processing the given user query using an encoder portion of a NLU model. For example, the embedding space representation of the candidate intent 202 can correspond to a candidate intent of "how to reset hypothetical router". In some implementations, user query A can correspond to "reset hypothetical brand router", user query B can correspond to "reset hypothetical brand", and user query C can correspond to "hypothetical brand router". The system can determine the distance between the embedding space representation of user query A 208 of "reset hypothetical brand router" and the embedding space representation of the candidate intent of "how to reset hypothetical router" is less than threshold distance 204. In some of those implementations, the system can determine the user query A corresponds to the candidate intent based on the distance.

Additionally or alternatively, the system can determine the distance between the embedding space representation of user query B 210A of "reset hypothetical brand" and the embedding space representation of the candidate intent 202 of "how to reset hypothetical brand router" is greater than the threshold distance 204 and less than the additional threshold distance 206. In some such implementations, the system can make a further determination of whether the user query corresponds to the candidate intent. For example, the system can query the user and determine whether the user query B 210A satisfies the candidate intent based on a response from the user.

Furthermore, the system can determine the distance between the embedding space representation of user query C 212 of "hypothetical router" and the embedding space representation of the candidate intent 202 of "how to reset hypothetical brand router" is greater than the threshold distance 204 and greater than the threshold distance 206. In some of those implementations, the system can determine the candidate intent C of "hypothetical router" does not correspond to the candidate intent of "how to reset hypothetical router" based on the distances.

Figure 2C:
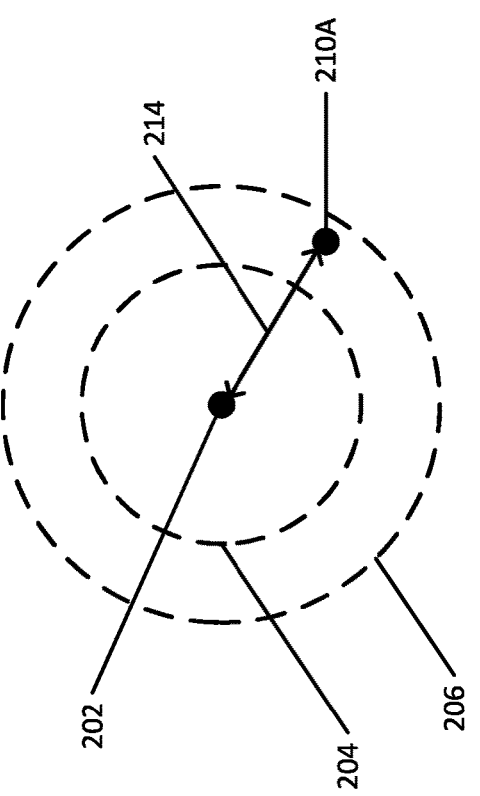
FIG. 2C illustrates an example of a mapping between the embedding space representation of the user query and an embedding space representation of a candidate intent in accordance with various implementations disclosed herein.

In some implementations, after determining the user query B 210A corresponds to the candidate intent 202, the system can generate a mapping between the embedding space representation of the user query and the embedding space representation of the candidate intent. For example, FIG. 2C illustrates a mapping 214 between the embedding space representation of the user query B 210A and the embedding space representation of the candidate intent 202. In some of those implementations, for an additional instance of the user query of "reset hypothetical brand", the system can determine the user query of "reset hypothetical brand" corresponds to the candidate intent of "how to reset hypothetical brand router" based on the mapping 214.

In some implementations, the system can generate training instance(s) to train the NLU model based on the user query and the candidate intent. In some implementations, the training instance can include a training user query and a corresponding training candidate intent. The training user query can be processed using the encoder portion of the NLU model to generate candidate output. A difference can be determined between the candidate output and the training candidate intent. In some implementations, one or more portions of the NLU model can be updated based on the determined difference. For example, a training instance can be generated based on the mapping 214, where the training instance can include a training user query portion of user query B 210A and a training candidate intent portion of candidate intent 202. In some implementations, retraining the NLU model, based on the mapping 214, can cause the encoder portion of the NLU model to generate an alternative embedding space representation of the user query.

Figure 2D:
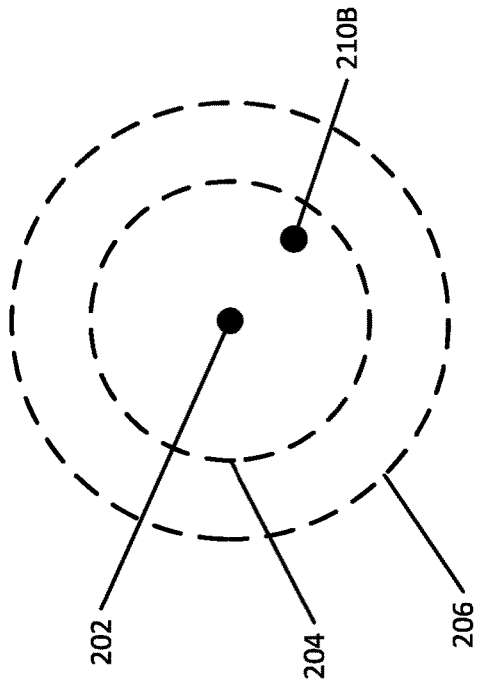
FIG. 2D illustrates an example of the embedding space representation of the user query and an updated embedding space representation of representation of the plurality of candidate intents in accordance with various implementations described herein.

FIG. 2D illustrates the embedding space representation of user query B 210B of "resent hypothetical brand" after retraining the NLU model. In the illustrated example, the embedding space representation of user query B 210B is a shorter distance from the embedding space representation of the candidate intent "how to reset hypothetical brand router" 202 after retraining the NLU model. For instance, the distance between the embedding space representation of the candidate intent 202 and the embedding space representation of the user query 210B is within the threshold distance 204, where the distance between the embedding space representation 202 and the embedding space representation of the candidate intent 210A was not within the threshold distance 204 (as described above with respect to FIG. 2B) prior to retraining.

Figure 3:
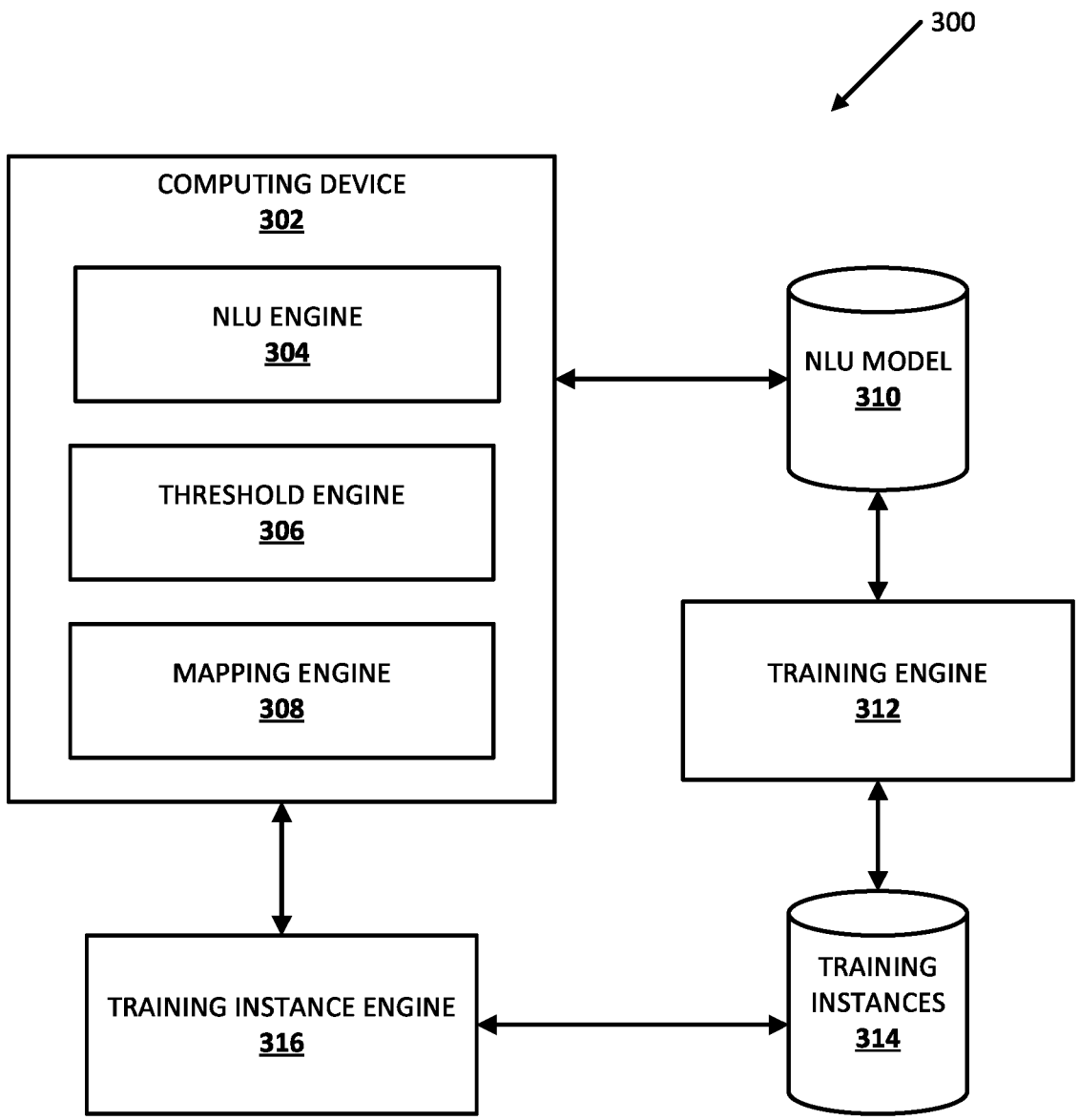
FIG. 3 illustrates an example environment in which various implementations described herein may be implemented.

FIG. 3 illustrates a block diagram of an example environment 300 in which implementations disclosed herein may be implemented. The example environment 300 includes a computing system 302 which can include NLU engine 304, threshold engine 306, mapping engine 308, training engine 312, training instance engine 316, and/or additional engine(s) (not depicted). Additionally or alternatively, computing system 302 may be associated with one or more interface input/output devices (not depicted). Furthermore, computing system 302 may be associated with input model 310, training instances 314, and/or one or more additional components (not depicted).

In some implementations, computing system 302 may include may include user interface input/output devices, which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing system 302 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 302 may be implemented on a computing system that also contains the user interface input/output devices. In some implementations computing system 302 may include an automated assistant (not depicted), and all or aspects of the automated assistant may be implemented on computing device(s) that are separate and remote from the client device that contains the user interface input/output devices (e.g., all or aspects may be implemented "in the cloud"). In some of those implementations, those aspects of the automated assistant may communicate with the computing device via one or more networks such as a local area network (LAN) and/or a wide area network (WAN) (e.g., the Internet).

Some non-limiting examples of computing system 302 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 302 may include one or more memories for storage of data and software applications, one or more processors for accessing data and executing applications, and other components that facilitate communication over a network. The operations performed by computing system 302 may be distributed across multiple computing devices. For example, computing programs running on one or more computers in one or more locations can be coupled to each other through a network.

As illustrated in FIG. 3, NLU engine 304 can be used to process natural language input (e.g., natural language input received via user interface input device(s)) to determine a candidate intent of the natural language input and an intent score indicating the probability the candidate intent corresponds to the natural language input. In some implementations, NLU engine 304 can be used to process the natural language input using NLU model 310.

In some implementations, threshold engine 306 can be used to determine whether a candidate intent corresponds to natural language input based on the generated intent score. For example, the system can determine whether the intent score satisfies a threshold likelihood value (e.g., the intent score is greater than the threshold likelihood value, greater than or equal to the threshold likelihood value, etc.), where satisfying the threshold likelihood value indicates the candidate intent corresponds to the user query. In some implementations, when the threshold engine 306 determines the intent score fails to satisfy the threshold likelihood value, the threshold engine 306 can determine whether the intent score satisfies an additional threshold likelihood value. In some of those implementations, an intent score satisfying the additional threshold likelihood value and failing to satisfy the threshold likelihood value can indicate the user query is "close" to the candidate intent.

In some implementations, after determining threshold engine 306 determines an intent score fails to satisfy a threshold likelihood value and the intent score satisfies an additional threshold likelihood value, mapping engine 308 can be used to determine whether the user query corresponds to the candidate intent. In some implementations, mapping engine 308 can determine whether a mapping exists between the candidate intent and the user query. In some implementations, the mapping can be a data structure (e.g., a pointer, etc.) which associates the candidate intent with the user query. In some implementations, mapping engine 308 can determine whether a mapping exists between an embedding space representation of the user query and an embedding space representation of the candidate intent.

Additionally or alternatively, in some implementations, when mapping engine 308 determines there is not a mapping between the user query and the candidate intent, mapping engine 308 can cause the computing device to query the user to determine whether the candidate intent corresponds to the user query. In some implementations, mapping engine 308 can generate a mapping based on a determination a user has affirmatively responded to the query to determine whether the candidate intent corresponds to the user query. Additionally or alternatively, mapping engine 308 can generate a mapping based on whether the number of times a user has affirmatively responded to the query to determine whether the candidate intent corresponds to the user query satisfies one or more conditions (e.g., whether a user has affirmatively responded to the query to determine whether the candidate intent corresponds to the user query a threshold value number of times). In some implementations, mapping engine 308 can generate an additional or alternative between a candidate intent and a user query, such as generating an entry in a feedback table.

Additionally or alternatively, mapping engine 308 can be used to purge a mapping once a given user query and corresponding candidate intent are used in retraining NLU model 310. For example, in addition to generating a mapping between a given user query and corresponding candidate intent, training instance engine 316 can be used to generate one or more training instances 314 based on the given user query and corresponding candidate intent. Training engine 312 can be used to retrain NLU model 310 based on one or more of the training instances 314. In some implementations, training engine 312 can retrain NLU model 310 in accordance with process 700 of FIG. 7 described herein.

Figure 4:
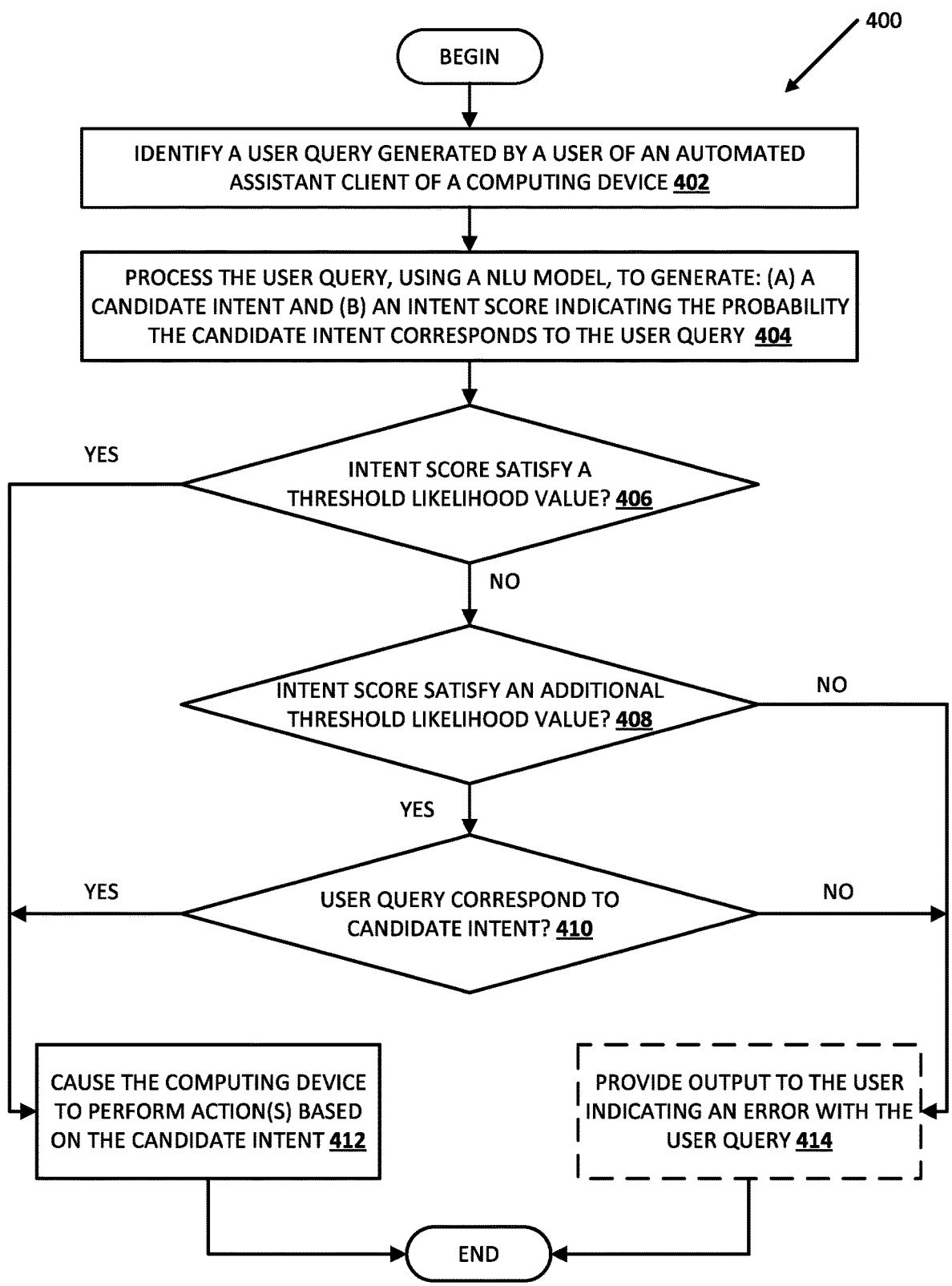
FIG. 4 is a flowchart illustrating an example process of determining whether a user query corresponds to a candidate intent in accordance with various implementations disclosed herein.

FIG. 4 is a flowchart illustrating a process 400 of determining whether a user query corresponds to a candidate intent in accordance with implementations disclosed herein. For convenience, the operations of the flowchart are described with reference to a system that performs the operations. This system may include various components of various computer systems, such as one or more components of computing system 302, and/or computing system 910. Moreover, while operations of process 400 are shown in a particular order, this is not meant to be limiting. One or more operations may be reordered, omitted, and/or added.

At block 402, the system identifies a user query generated by a user of an automated assistant client of a computing device. For example, the system can identify a natural language spoken utterance spoken by a user, captured via one or more microphones of the computing system. Additionally or alternatively, the system can identify natural language text provided by a user of the computing system (e.g., via a keyboard). In some implementations, the user query can be directed at an automated assistant. For example, the system can identify a user query of "today weather".

At block 404, the system processes the user query, using an NLU model, to generate: (a) a candidate intent and (b) an intent score indicating the probability the candidate intent corresponds to the user query. For example, the system can process the user query of "today weather" using the NLU model to generate a candidate intent of "what is today's weather". Additionally or alternatively, the system can generate an intent score indicating the probability the user query "today weather" corresponds to the candidate intent of "what is today's weather". For instance, the system can generate an intent score ranging from 0 to 100 percent, from 0 to 1, one/or more additional and or alternative intent scores, and/or combinations thereof.

At block 406, the system determines whether the intent score satisfies one or more conditions including a threshold likelihood value. In some implementations, the intent score satisfying the threshold likelihood value can indicate the user query corresponds to the candidate intent. For example, the value of intent score can satisfy the threshold likelihood value when the intent score is greater than, equal to, greater than or equal to, less than, less than or equal to, one or more additional or alternative relationships, and/or combinations thereof of the threshold likelihood value. If the system determines the intent score satisfies threshold likelihood value, the system proceeds to block 412. If the system determines the intent score fails to satisfy the threshold likelihood value, the system proceeds to block 408. For example, the system can determine an intent score of 95% satisfies a threshold likelihood value of 90%. In other words, the system can determine the intent score of 95% is greater than the threshold likelihood value of 90%. Additionally or alternatively, the system can determine an intent score of 85% fails to satisfy a threshold likelihood value of 89%. In other words, the system can determine the intent score of 85% is lower than the threshold likelihood value of 89%.

At block 408, the system determines whether the intent score satisfies an additional threshold likelihood value. In some implementations, failing to satisfy the threshold likelihood value and satisfying the additional threshold likelihood value can indicate to the system that the user query is "close" to the candidate intent. In some of those implementations, the system can perform further analysis on such a "close" user query to determine whether the user query corresponds to the candidate intent. In some implementations, the additional threshold likelihood value can be a lower threshold than the threshold likelihood value. For example, the system can utilize a threshold likelihood value of 0.95 and an additional threshold likelihood value of 0.93. As another example, the system can utilize a threshold likelihood value of 10 and an additional threshold likelihood value of 9.8. If the system determines the intent score satisfies the additional threshold likelihood value, the system proceeds to block 410. If the system determines the intent score does not satisfy the additional threshold value, the system proceeds to block 414.

At block 410, the system determines whether the user query corresponds to the candidate intent. In some implementations, the system can cause the computing device to render output querying the user to determine whether the user query corresponds to the candidate intent. For example, the system can cause the computing device to render output of "did you mean [candidate intent]". The system can determine whether the user query corresponds to the candidate intent based on the user's response. For instance, the system can determine the candidate intent corresponds to the user query if the user responds "yes" to the prompt "did you mean [candidate intent]". Additionally or alternatively, the system can determine the candidate intent does not correspond to the user query if the user responds "no" to the prompt "did you mean [candidate intent]".

Additionally or alternatively, the system can determine whether there is a mapping between the candidate intent and the user query. For example, the system can determine whether there is a mapping, in embedding space, between the embedding space representation of the candidate intent and the embedding space representation of the user query. In some implementations, the system can determine whether the user query corresponds to the candidate intent in accordance with process 600 as described in FIG. 6 herein. In some implementations, a mapping can be a personalized mapping, personalized to a user of the system. In some implementations, a mapping can be a global mapping, and can be utilized by a plurality of users (e.g., two users, ten users, all users, etc.). As a further example, the system can determine whether the user query and the candidate intent correspond based on a feedback table.

At block 412, the system causes the computing device to perform one or more actions based on the candidate intent. For example, the system can render output responsive to the user query for the user. In some implementations, after causing the computing device to perform action(s) based on the candidate intent, the process can end.

At block 414, the system optionally provides output to the user indicating an error with the user query. For example, the system can render output of "I'm sorry, I do not understand". After optionally providing output indicating the error, the process can end.

Figure 5:
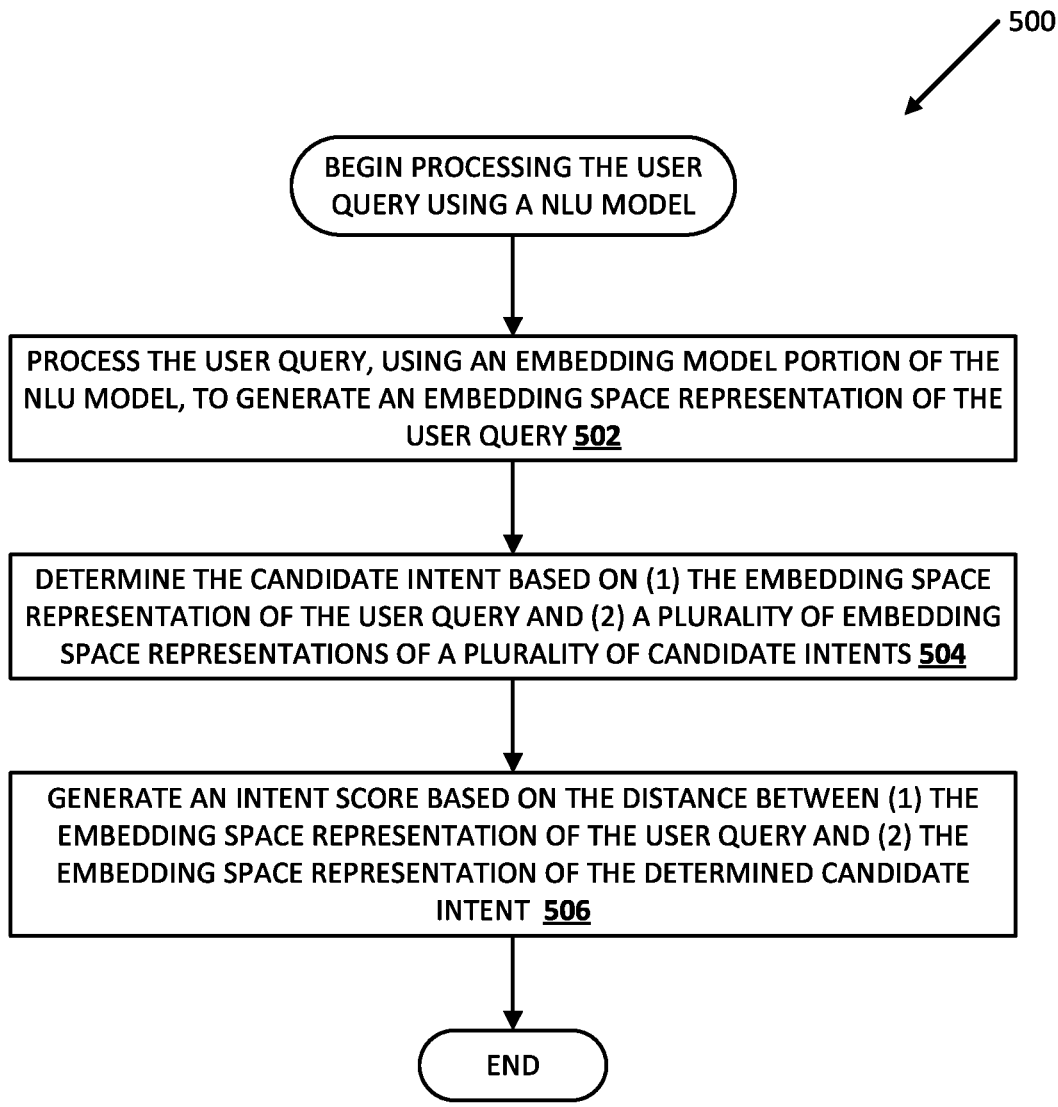
FIG. 5 is a flowchart illustrating an example process of generating a candidate intent and an intent score indicating the probability a user query corresponds to the candidate intent in accordance with various implementations disclosed herein.

FIG. 5 is a flowchart illustrating a process 500 of processing a user query using a NLU model to generate an intent score in accordance with implementations disclosed herein. For convenience, the operations of the flowchart are described with reference to a system that performs the operations. This system may include various components of various computer systems, such as one or more components of computing system 302, and/or computing system 910. Moreover, while operations of process 500 are shown in a particular order, this is not meant to be limiting. One or more operations may be reordered, omitted, and/or added.

At block 502, the system processes the user query, using an encoder portion of a NLU model to generate an embedding space representation of the user query. For example, embedding space representation of user query 208, 210A, and 212 are illustrated in FIG. 2B described herein.

At block 504, the system determines the candidate intent based on (1) the embedding space representation of the user query and (2) a plurality of embedding space representations of a plurality of candidate intents. In some implementations, the system can determine the candidate intent by comparing the embedding space representation of the user query with one or more embedding space representations of one or more candidate intents. In some implementations, the generated candidate intent can be selected based on the embedding space representation closest (i.e., with the shortest distance) to the embedding space representation of the user query. For example, an embedding space representation of a given user intent can be 5 units away from an embedding space representation of a first candidate intent, and can be 15 units away from an embedding space representation of a second candidate intent. In some of those implementations, the system can select the first candidate intent based on the embedding space representation of the first candidate intent being closer to the embedding space representation of the user query than the embedding space representation of the second candidate intent is to the embedding space representation of the user query (i.e., the distance of 5 units is smaller than the distance of 15 units, thus the first candidate intent with a distance of 5 units from the user query may be selected).

At block 506, the system generates an intent score based on the distance between (1) the embedding space representation of the user query and (2) the embedding space representation of the determined candidate intent. In some implementations, the intent score can be the distance between the embedding space representation of the user query and the embedding space representation of the determined candidate intent. For example, the system can generate an intent score of 5 for a given user query and a determined candidate intent, where the distance between the embedding space representation of the user query and the embedding space representation of the candidate intent is 5 units. In some other implementations, the system can generate the intent score based on the distance between the embedding space representation of the user query and the embedding space representation of the determined candidate intent. For example, the system can normalize the distance, transform the distance into a percentage, perform one or more additional or alternative computations based on the distance, and/or combinations thereof.

Figure 6:
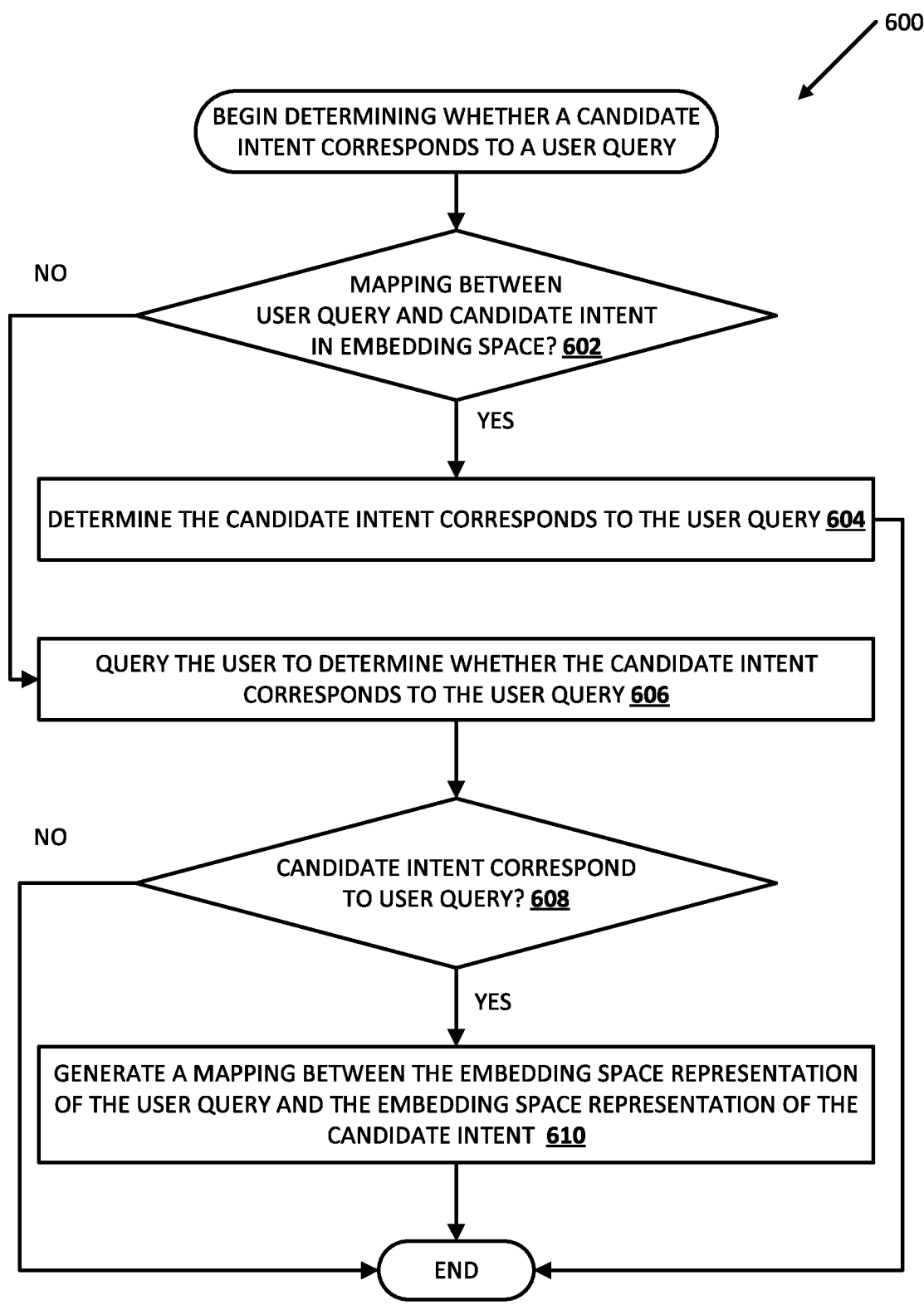
FIG. 6 is a flowchart illustrating an example process of determining whether a candidate intent corresponds to a user query in accordance with various implementations disclosed herein.

FIG. 6 is a flowchart illustrating a process 600 of generating a mapping between an embedding space representation of a user query and an embedding space representation of a candidate intent in accordance with implementations disclosed herein. For convenience, the operations of the flowchart are described with reference to a system that performs the operations. This system may include various components of various computer systems, such as one or more components of computing system 302, and/or computing system 910. Moreover, while operations of process 600 are shown in a particular order, this is not meant to be limiting. One or more operations may be reordered, omitted, and/or added.

At block 602, the system determines whether a mapping exists between a user query and a candidate intent in embedding space. In some implementations, a mapping can be generated in accordance with a previous iteration of the user query in step 610 described herein. For example, a mapping 214 between an embedding space representation of a user query 210A and an embedding space representation of a candidate intent 202 is described herein with reference to FIG. 2C. If the system determines the mapping exists, the system proceeds to block 604. If the system determines the mapping does not exist, the system proceeds to block 606.

At block 604, the system determines the candidate intent corresponds to the user query and the process ends. In some implementations, the system determines the candidate intent corresponds to the user query based on the mapping determined at block 602. For example, the system can determine a given user query corresponds to a candidate intent by determining the mapping at block 602.

At block 606, the system queries the user to determine whether the candidate intent corresponds to the user query. For example, the system can cause the computing device to render output of "did you mean [candidate intent]".

At block 608, the system determines whether the user indicated the candidate intent corresponds to the user query. For example, the system can determine the user's response to the query at block 606. For instance, at block 606 the system can render output of "did you mean [candidate intent]". If the user responds affirmatively, the system can determine the user query corresponds to the candidate intent. If the user responds negatively, the system can determine the user query does not correspond to the candidate intent. If the system determines the candidate intent corresponds to the user query, the system proceeds to block 610. If the system determines the candidate intent does not correspond to the user query, the process ends.

At block 610, the system generates a mapping between the embedding space representation of the user query and the embedding space representation of the candidate intent. In some implementations, the mapping can include a data structure which points from the candidate intent to the user query and/or points from the user query to the candidate intent (e.g., the system generates a pointer from the candidate intent to the user query and/or the system generates a pointer from the user query to the candidate intent). In some implementations, the system can generate the mapping if the number of times the given user query has been determined to correspond to the candidate intent satisfies one or more conditions, such as whether the number of times the given user query, provided by any user, has been determined to correspond to the candidate intent exceeds a threshold value, whether the number of times the given user query, provided by a specific user, has been determined to correspond to the candidate intent exceeds a threshold value, whether one or more additional or alternative conditions are satisfied, and/or combinations thereof.

In some implementations, mappings can be personalized for a particular user. For example, mapping(s) can be stored in association with a user profile of the particular user. Additionally or alternatively, mappings can be global mappings, where the mapping can be utilized by a plurality of users. In some implementations, mapping(s) can be stored locally at a client device (e.g., the mapping(s) can be stored locally on a user's cell phone). Additionally or alternatively, mapping(s) can be stored on a remote computing device (e.g., the mapping(s) can be stored on a remote server).

Figure 7:
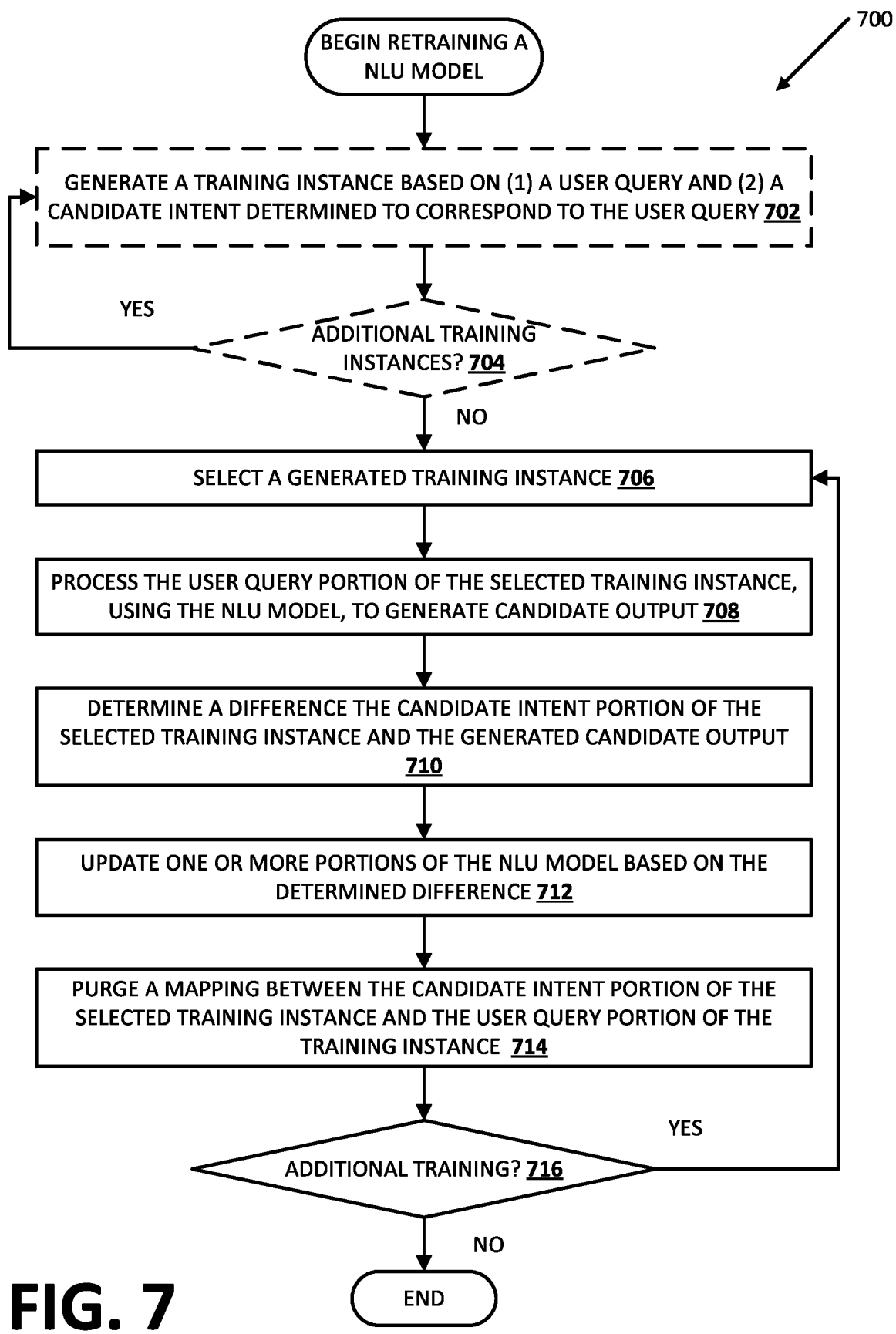
FIG. 7 is a flowchart illustrating an example process of retraining a NLU model in accordance with various implementations disclosed herein.

FIG. 7 is a flowchart illustrating a process 700 of retraining a NLU model in accordance with implementations disclosed herein. For convenience, the operations of the flowchart are described with reference to a system that performs the operations. This system may include various components of various computer systems, such as one or more components of computing system 302, and/or computing system 910. Moreover, while operations of process 700 are shown in a particular order, this is not meant to be limiting. One or more operations may be reordered, omitted, and/or added.

At block 702, the system optionally generates a training instance based on (1) a user query and (2) a candidate intent determined to correspond to the user query. For example, the system can generate a training instance that includes a training user query and a corresponding training intent. In some implementations, the training instance can be based on a mapping between a user query and a candidate intent generated in accordance with techniques described herein.

At block 704, the system determines whether to generate any additional training instances. If the system determines to generate any additional training instances, the system proceeds back to block 702 and generates an additional training instance based on (1) an additional user query and (2) an additional candidate intent corresponding to the additional user query. If the system determines to not generate further training instances, the system proceeds to block 706.

At block 706, the system selects a generated training instance.

At block 708, the system processes the user query portion of the selected training instance, using the NLU model, to generate candidate output. In some implementations, the system can process the user query portion of the selected training instance using the NLU model to generate an embedding space representation of the training user query. In some of those implementations, the system can generate the candidate output based on an embedding space representation of the candidate output.

At block 710, the system determines a difference between the candidate intent portion of the selected training instance and the generated output.

At block 712, the system updates one or more portions of the NLU model based on the determined difference.

At block 714, the system purges a mapping between the candidate intent portion of the selected training instance and the user query portion of the selected training instance. In some implementations, retraining the NLU model at block 714 can eliminate the need for the mapping. In other words, the retrained NLU model can generate the candidate intent portion of the selected training instance when it is used to process the user query portion of the training instance.

At block 716, the system determines whether to perform any additional training of the NLU model. If the system determines to perform additional training, the system proceeds back to block 706, selects an additional training instance, and proceeds to blocks 708, 710, 712, and 714 based on the selected training instance. If the system determines to stop performing training, the process ends.

Figure 8:
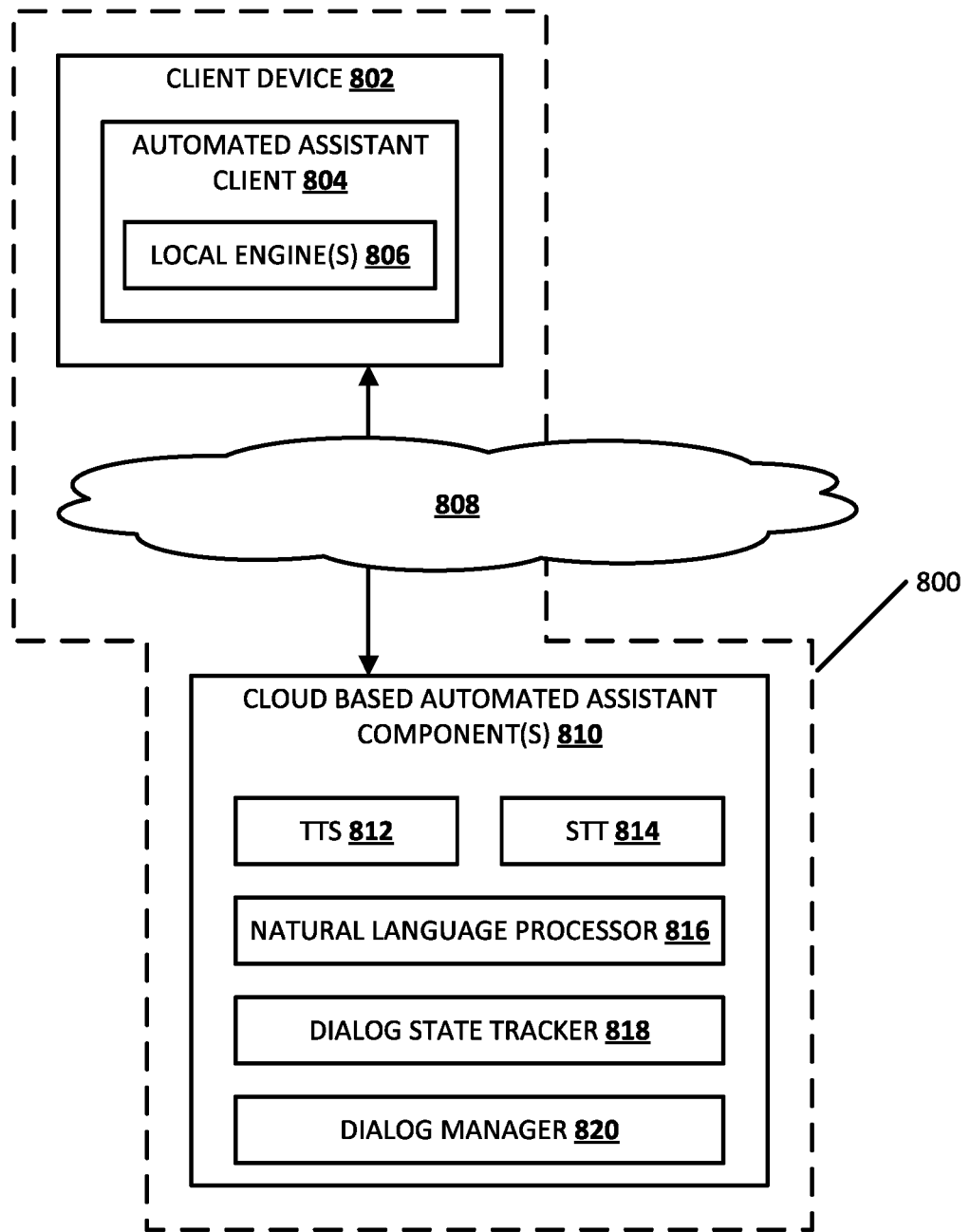
FIG. 8 illustrates another example environment in which various implementations described herein may be implemented.

Turning now to FIG. 8, an example environment is illustrated where various implementations can be performed. FIG. 8 is described initially, and includes a client computing device 802, which executes an instance of an automated assistant client 804. One or more cloud-based automated assistant components 810 can be implemented on one or more computing systems (collectively referred to as a "cloud" computing system) that are communicatively coupled to client device 802 via one or more local and/or wide area networks (e.g., the Internet) indicated generally at 808.

An instance of an automated assistant client 804, by way of its interactions with one or more cloud-based automated assistant components 810, may form what appears to be, from the user's perspective, a logical instance of an automated assistant 800 with which the user may engage in a human-to-computer dialog. An instance of such an automated assistant 800 is depicted in FIG. 8. It thus should be understood that in some implementations, a user that engages with an automated assistant client 804 executing on client device 802 may, in effect, engage with his or her own logical instance of an automated assistant 800. For the sakes of brevity and simplicity, the term "automated assistant" as used herein as "serving" a particular user will often refer to the combination of an automated assistant client 804 executing on a client device 802 operated by the user and one or more cloud-based automated assistant components 810 (which may be shared amongst multiple automated assistant clients of multiple client computing devices). It should also be understood that in some implementations, automated assistant 800 may respond to a request from any user regardless of whether the user is actually "served" by that particular instance of automated assistant 800.

The client computing device 802 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 802 may optionally operate one or more other applications that are in addition to automated assistant client 804, such as a message exchange client (e.g., SMS, MMS, online chat), a browser, and so forth. In some of those various implementations, one or more of the other applications can optionally interface (e.g., via an application programming interface) with the automated assistant 800, or include their own instance of an automated assistant application (that may also interface with the cloud-based automated assistant component(s) 810).

Automated assistant 800 engages in human-to-computer dialog sessions with a user via user interface input and output devices of the client device 802. To preserve user privacy and/or to conserve resources, in many situations a user must often explicitly invoke the automated assistant 800 before the automated assistant will fully process a spoken utterance. The explicit invocation of the automated assistant 800 can occur in response to certain user interface input received at the client device 802. For example, user interface inputs that can invoke the automated assistant 800 via the client device 802 can optionally include actuations of a hardware and/or virtual button of the client device 802. Moreover, the automated assistant client can include one or more local engines 806, such as an invocation engine that is operable to detect the presence of one or more spoken invocation phrases. The invocation engine can invoke the automated assistant 800 in response to detection of one of the spoken invocation phrases. For example, the invocation engine can invoke the automated assistant 800 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 106, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 800. As used herein, "invoking" the automated assistant 800 can include causing one or more previously inactive functions of the automated assistant 800 to be activated. For example, invoking the automated assistant 800 can include causing one or more local engines 806 and/or cloud-based automated assistant components 810 to further process audio data frames based on which the invocation phrase was detected, and/or one or more following audio data frames (whereas prior to invoking no further processing of audio data frames was occurring). For instance, local and/or cloud-based components can generate refined versions of audio data and/or perform other processing in response to invocation of the automated assistant 800. In some implementations, the spoken invocation phrase can be processed to generate a speaker embedding that is used in generating a refined version of audio data that follows the spoken invocation phrase. In some implementations, the spoken invocation phrase can be processed to identify an account associated with a speaker of the spoken invocation phrase, and a stored speaker embedding associated with the account utilized in generating a refined version of audio data that follows the spoken invocation phrase.

The one or more local engine(s) 806 of automated assistant 800 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 802 may be relatively constrained in terms of computing resources (e.g., processor cycles, memory, battery, etc.), the local engines 806 may have limited functionality relative to any counterparts that are included in cloud-based automated assistant components 810.

Cloud-based automated assistant components 810 leverage the virtually limitless resources of the cloud to perform more robust and/or more accurate processing of audio data, and/or other user interface input, relative to any counterparts of the local engine(s) 806. Again, in various implementations, the client device 802 can provide audio data and/or other data to the cloud-based automated assistant components 810 in response to the invocation engine detecting a spoken invocation phrase, or detecting some other explicit invocation of the automated assistant 800.

The illustrated cloud-based automated assistant components 810 include a cloud-based TTS module 812, a cloud-based STT module 814, a natural language processor 816, a dialog state tracker 818, and a dialog manager 820. In some implementations, one or more of the engines and/or modules of automated assistant 800 may be omitted, combined, and/or implemented in a component that is separate from automated assistant 800. Further, in some implementations automated assistant 800 can include additional and/or alternative engines and/or modules. Cloud-based STT module 814 can convert audio data into text, which may then be provided to natural language processor 816.

Cloud-based TTS module 812 can convert textual data (e.g., natural language responses formulated by automated assistant 800) into computer-generated speech output. In some implementations, TTS module 812 may provide the computer-generated speech output to client device 802 to be output directly, e.g., using one or more speakers. In other implementations, textual data (e.g., natural language responses) generated by automated assistant 800 may be provided to one of the local engine(s) 806, which may then convert the textual data into computer-generated speech that is output locally.

Natural language processor 816 of automated assistant 800 processes free form natural language input and generates, based on the natural language input, annotated output for use by one or more other components of the automated assistant 800. For example, the natural language processor 816 can process natural language free-form input that is textual input that is a conversion, by STT module 814, of audio data provided by a user via client device 802. The generated annotated output may include one or more annotations of the natural language input and optionally one or more (e.g., all) of the terms of the natural language input.

In some implementations, the natural language processor 816 is configured to identify and annotate various types of grammatical information in natural language input. In some implementations, the natural language processor 816 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 816 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 816 may rely on annotations from one or more other components of the natural language processor 816. In some implementations, in processing a particular natural language input, one or more components of the natural language processor 816 may use related prior input and/or other related data outside of the particular natural language input to determine one or more annotations.

In some implementations, dialog state tracker 818 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 820 may be configured to map a current dialog state, e.g., provided by dialog state tracker 818, to one or more "responsive actions" of a plurality of candidate responsive actions that are then performed by automated assistant 800. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 800 outputting additional natural language dialog. This responsive dialog may include, for instance, requests that the user provide parameters for some action (i.e., fill slots) that dialog state tracker 818 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 9:
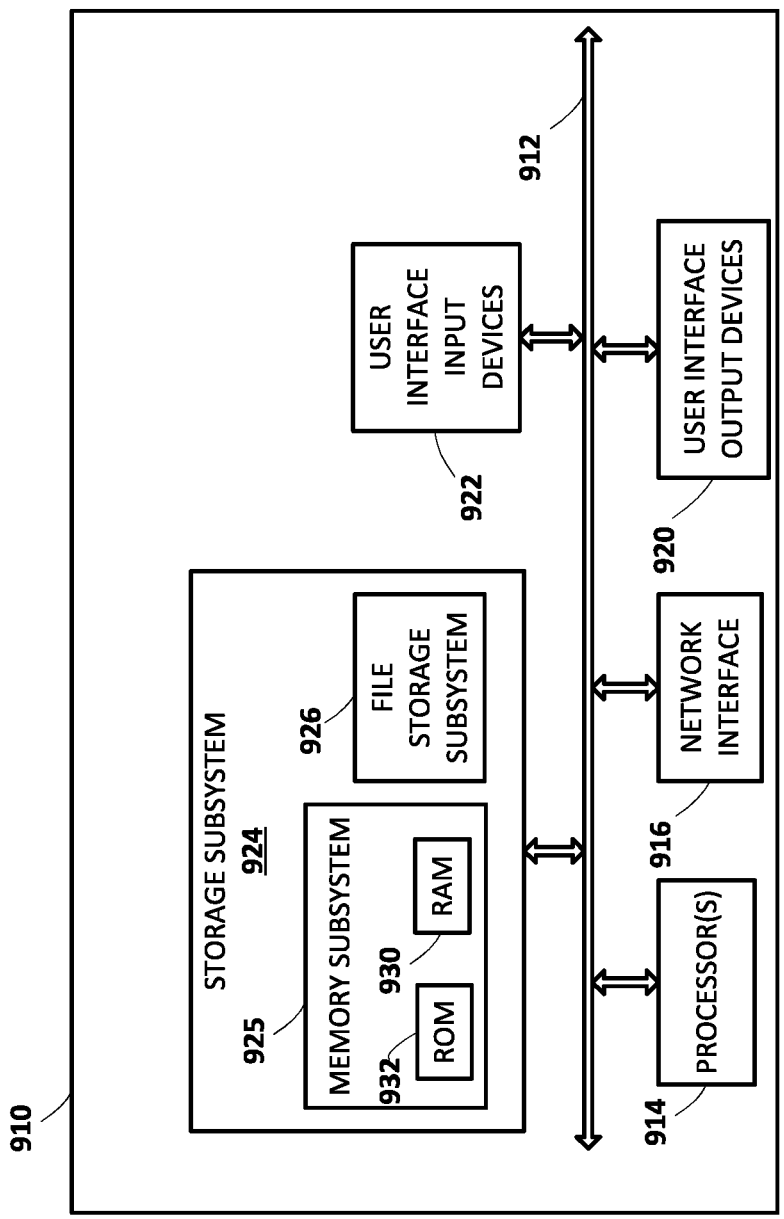
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of one or more of the processes of FIG. 4, FIG. 5, FIG. 6, and/or FIG. 7, as well as to implement various components depicted in FIG. 3 and/or FIG. 8.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes identifying a user query, generated by a user of an automated assistant client of a computing device. The method further includes processing the user query using a natural language understanding model to generate (a) a candidate intent and (b) an intent score indicating the probability the candidate intent corresponds to the user query. The method further includes determining whether the intent score satisfies one or more conditions, wherein determining whether the intent score satisfies the one or more conditions includes determining whether the intent score satisfies a threshold likelihood value. In response to determining the intent score satisfies the threshold likelihood value, the method further includes causing the automated assistant client to perform one or more actions based on the candidate intent. In response to determining the intent score fails to satisfy the threshold likelihood value, and determining the intent score satisfies an additional threshold likelihood value, where the additional threshold likelihood value is less than the threshold likelihood value, the method further includes determining whether the candidate intent corresponds to the user query. In response to determining the candidate intent corresponds to the user query, the method further includes causing the automated assistant to perform the one or more actions based on the candidate intent.

These and other implementations of the technology can include one or more of the following features.

In some implementations, the intent score corresponds to a distance in an embedding space between an embedding space representation of the user query and an embedding space representation of the candidate intent. In some versions of those implementations, determining whether the intent score fails to satisfy the threshold likelihood value and satisfies the additional threshold likelihood value includes determining the distance in the embedding space fails to satisfy the threshold likelihood value. In some implementations, the method further includes determining the distance in the embedding space satisfies the additional threshold likelihood value. In some versions of those implementations, determining whether the candidate intent corresponds to the user query includes rendering output for the user, via the computing device, wherein the output includes a prompt for the user to determine whether the candidate intent corresponds to the user query. In some implementations, the method further includes receiving input, from the user, responsive the rendered output. In some versions of those implementations, in response to receiving input, from the user, responsive to the rendered output, indicating the candidate intent corresponds to the user query, the method further includes generating a mapping between the embedding space representation of the candidate intent and the embedding space representation of the user query. In some versions of those implementations, the method further includes generating a training instance for the natural language understanding model based on the user query and the candidate intent. In some versions of those implementations, prior to retraining the natural language understanding model based on the generated training instance, the method further includes receiving an additional instance of the user query for the user or an additional user of the automated assistant of the computing device. In some implementations, the method further includes processing the additional instance of the user query using the natural language understanding model to generate (a) the candidate intent and (b) the intent score indicating the probability the candidate intent corresponds to the user query. In some implementations, the method further includes determining whether the candidate intent corresponds to the user query based on the mapping between the embedding space representation of the candidate intent and the embedding space representation of the user query. In some versions of those implementations, the method further includes retraining the natural language understanding model based on (a) the generated training instance or (b) the generated training instance and one or more additional training instances. In some implementations, based on retraining the natural language understanding model, the method further includes purging the mapping between the embedding space representation of the candidate intent and the embedding space representation of the user query. In some versions of those implementations, subsequent to retraining the natural language understanding model, the method further includes confirming the purging of the mapping between the embedding space representation of the candidate intent and the embedding space representation of the user query.

In some implementations, the mapping between the embedding space representation of the candidate intent and the embedding space representation of the user query is a personalized mapping stored in association with a user profile associated with the user.

In some implementations, the mapping between the embedding space of the representation of the candidate intent and the embedding space representation of the user query is a global mapping applicable to a plurality of users including the user.

In some implementations, determining whether the candidate intent corresponds to the user query includes determining whether a count of previous occurrences of the candidate intent corresponding to the user query satisfies one or more further conditions, wherein determining whether the count of previous occurrences of the candidate intent corresponding to the user query satisfies a further threshold likelihood value.

In some implementations, determining whether the candidate intent corresponds to the user query includes determining whether the candidate intent corresponds to the user query based on a feedback table. In some versions of those implementations, the method further includes identifying the user who generated the user query. In some implementations, determining whether the candidate intent corresponds to the user query based on the feedback table includes identifying a personalized feedback table stored in association with a user profile corresponding to the identified user. In some implementations, the method further includes determining whether the candidate intent corresponds to the user query based on the personalized feedback table.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
   identifying a user query, generated by a user of an automated assistant client of a computing device;
   processing the user query using a natural language understanding (NLU) model to generate (a) a candidate intent and (b) an intent score indicating the probability the candidate intent corresponds to the user query;
   determining whether the intent score satisfies one or more conditions, wherein determining whether the intent score satisfies the one or more conditions includes determining whether the intent score satisfies a threshold likelihood value;
   in response to determining the intent score satisfies the threshold likelihood value, causing the automated assistant client to perform one or more actions based on the candidate intent; and
   in response to determining the intent score fails to satisfy the threshold likelihood value, and determining the intent score satisfies an additional threshold likelihood value, where the additional threshold likelihood value is less than the threshold likelihood value:
      determining whether the candidate intent corresponds to the user query, wherein determining whether the candidate intent corresponds to the user query comprises:
         causing rendering of output via the computing device, wherein the output includes a prompt, for the user, to determine whether the candidate intent corresponds to the user query,
         receiving input, from the user, responsive to the output being rendered, and
         determining, based on the input, that the candidate intent corresponds to the user query;
      generating, in response to determining, based on the input that is responsive to the output that includes the prompt, that the candidate intent corresponds to the user query a mapping that is specific to the user and that is between an embedding space representation of the candidate intent and an embedding space representation of the user query; and
      prior to retraining of the NLU model:
         receiving an additional user query, generated by a user of the automated assistant of the computing device,
         determining, based on the mapping that is specific to the user, whether the additional user query corresponds to the candidate intent, and
         in response to determining, based on the mapping, that the candidate intent corresponds to the additional user query, causing the automated assistant to perform the one or more actions based on the candidate intent, and
         causing, responsive to the NLU model being retrained, purging of the mapping between the embedding space representation of the candidate intent and the embedding space representation of the user query.

2. The method of claim 1, wherein the intent score corresponds to a distance in the embedding space between the embedding space representation of the user query and the embedding space representation of the candidate intent.

3. The method of claim 2, wherein determining whether the intent score fails to satisfy the threshold likelihood value and satisfies the additional threshold likelihood value comprises:
   determining the distance in the embedding space fails to satisfy the threshold likelihood value; and
   determining the distance in the embedding space satisfies the additional threshold likelihood value.

4. The method of claim 1, further comprising:
   generating a training instance for the (NLU) model based on the user query and the candidate intent.

5. The method of claim 4, further comprising:
   Retraining the (NLU) model based on (a) the generated training instance or (b) the generated training instance and one or more additional training instances; and
   based on retraining the (NLU) model, purging the mapping between the embedding space representation of the candidate intent and the embedding space representation of the user query.

6. The method of claim 5, further comprising:
subsequent to retraining the (NLU) model, confirming the purging of the mapping between the embedding space representation of the candidate intent and the embedding space representation of the user query.

7. The method of claim 1, wherein the mapping between the embedding space representation of the candidate intent and the embedding space representation of the user query is a personalized mapping stored in association with a user profile associated with the user.

8. The method of claim 1, wherein the mapping between the embedding space of the representation of the candidate intent and the embedding space representation of the user query is a global mapping applicable to a plurality of users including the user.

9. The method of claim 1, wherein determining whether the candidate intent corresponds to the user query further comprises:
determining whether a count of previous occurrences of the candidate intent corresponding to the user query satisfies one or more further conditions, wherein determining whether the count of previous occurrences of the candidate intent corresponding to the user query satisfies a further threshold likelihood value.

10. The method of claim 1, wherein determining whether the candidate intent corresponds to the user query further comprises:
determining whether the candidate intent corresponds to the user query based on a feedback table.

11. The method of claim 10, further comprising:
identifying the user who generated the user query; and
wherein determining whether the candidate intent corresponds to the user query based on the feedback table further comprises:
identifying a personalized feedback table stored in association with a user profile corresponding to the identified user; and
determining whether the candidate intent corresponds to the user query based on the personalized feedback table.

12. The method of claim 1, wherein the additional query is an additional instance of the user query.

13. The method of claim 1, further comprising, subsequent to causing the automated assistant to perform the one or more actions based on the candidate intent:
causing, responsive to the NLU model being retrained, purging of the mapping between the embedding space representation of the candidate intent and the embedding space representation.

14. A non-transitory computer readable medium configured to store instructions that, when executed by one or more processors, cause the one or more processors to perform operations that include:
identifying a user query, generated by a user of an automated assistant client of a computing device;
processing the user query using a natural language understanding (NLU) model to generate (a) a candidate intent and (b) an intent score indicating the probability the candidate intent corresponds to the user query;
determining whether the intent score satisfies one or more conditions, wherein determining whether the intent score satisfies the one or more conditions includes determining whether the intent score satisfies a threshold likelihood value;
in response to determining the intent score satisfies the threshold likelihood value, causing the automated assistant client to perform one or more actions based on the candidate intent; and
in response to determining the intent score fails to satisfy the threshold likelihood value, and determining the intent score satisfies an additional threshold likelihood value, where the additional threshold likelihood value is less than the threshold likelihood value:
determining whether the candidate intent corresponds to the user query,
wherein determining whether the candidate intent corresponds to the user query comprises:
causing rendering of output via the computing device, wherein the output includes a prompt, for the user, to determine whether the candidate intent corresponds to the user query,
receiving input, from the user, responsive to the output being rendered, and
determining, based on the input, that the candidate intent corresponds to the user query;
generating, in response to determining, based on the input that is responsive to the output that includes the prompt, that the candidate intent corresponds to the user query:
a mapping that is specific to the user and that is between an embedding space representation of the candidate intent and an embedding space representation of the user query; and
prior to retraining of the NLU model:
receiving an additional user query, generated by a user of the automated assistant of the computing device,
determining, based on the mapping that is specific to the user, whether the additional user query corresponds to the candidate intent, and
in response to determining, based on the mapping, that the candidate intent corresponds to the additional user query, causing the automated assistant to perform the one or more actions based on the candidate intent, and
causing, responsive to the NLU model being retrained, purging of the mapping between the embedding space representation of the candidate intent and the embedding space representation of the user query.

15. The non-transitory computer readable medium of claim 14, wherein the intent score corresponds to a distance in the embedding space between the embedding space representation of the user query and the embedding space representation of the candidate intent.

16. The non-transitory computer readable medium of claim 15, wherein determining whether the intent score fails to satisfy the threshold likelihood value and satisfies the additional threshold likelihood value comprises:
determining the distance in the embedding space fails to satisfy the threshold likelihood value; and
determining the distance in the embedding space satisfies the additional threshold likelihood value.

17. A system comprising:
one or more processors; and
memory configured to store instructions that, when executed by one or more processors, cause the one or more processors to perform operations that include:
identifying a user query, generated by a user of an automated assistant client of a computing device;
processing the user query using a natural language understanding (NLU) model to generate (a) a candidate intent and (b) an intent score indicating the probability the candidate intent corresponds to the user query;

determining whether the intent score satisfies one or more conditions, wherein determining whether the intent score satisfies the one or more conditions includes determining whether the intent score satisfies a threshold likelihood value;

in response to determining the intent score satisfies the threshold likelihood value, causing the automated assistant client to perform one or more actions based on the candidate intent; and in response to determining the intent score fails to satisfy the threshold likelihood value, and determining the intent score satisfies an additional threshold likelihood value, where the additional threshold likelihood value is less than the threshold likelihood value:

determining whether the candidate intent corresponds to the user query, wherein determining whether the candidate intent corresponds to the user query comprises:

causing rendering of output via the computing device, wherein the output includes a prompt, for the user, to determine whether the candidate intent corresponds to the user query, receiving input, from the user, responsive to the output being rendered, and determining, based on the input, that the candidate intent corresponds to the user query;

generating, in response to determining, based on the input that is responsive to the output that includes the prompt, that the candidate intent corresponds to the user query:

a mapping that is specific to the user and that is between an embedding space representation of the candidate intent and an embedding space representation of the user query; and prior to retraining of the NLU model:

receiving an additional user query, generated by a user of the automated assistant of the computing device, determining, based on the mapping that is specific to the user, whether the additional user query corresponds to the candidate intent, and in response to determining, based on the mapping, that the candidate intent corresponds to the additional user query, causing the automated assistant to perform the one or more actions based on the candidate intent, and causing, responsive to the NLU model being retrained, purging of the mapping between the embedding space representation of the candidate intent and the embedding space representation of the user query.

18. The system of claim 17, wherein the additional query is an additional instance of the user query.

19. The system of claim 17, wherein the operations further include, subsequent to causing the automated assistant to perform the one or more actions based on the candidate intent:

causing, responsive to the NLU model being retrained, purging of the mapping between the embedding space representation of the candidate intent and the embedding space representation.

20. The system of claim 17, wherein the mapping between the embedding space representation of the candidate intent and the embedding space representation of the user query is a personalized mapping stored in association with a user profile associated with the user.

* * * * *